2 Sheets--Sheet 1.

G. R. WINKLER.

Improvement in Swing-Bridges.

No. 4,926. Reissued May 28, 1872.

Witnesses.
H. Carlin Clark
Charles E. Chinn

Assignees.
Bernhardt Berndt
Martha Winkler by
Dyer, Beadle & Co.
attys.

AM. PHOTO-LITHOGRAPHIC CO. N.Y. (OSBORNE'S PROCESS.)

2 Sheets--Sheet 2.

G. R. WINKLER.

Improvement in Swing-Bridges.

No. 4,926. Reissued May 28, 1872.

Witnesses
H. Carlin Clark
Charles E. Chinn

Assignees
Bernhardt & Berndt.
Martha Winkler by
Dyer, Beadle & Co.
attys.

A.M. PHOTO-LITHOGRAPHIC CO. N.Y. (OSBORNE'S PROCESS.)

UNITED STATES PATENT OFFICE.

GUSTAVUS R. WINKLER, OF WILLIAMSPORT, PENNSYLVANIA, ASSIGNOR TO BERNHARDT BERNDT AND MARTHA WINKLER, OF SAME PLACE.

IMPROVEMENT IN SWING-BRIDGES.

Specification forming part of Letters Patent No. 86,117, dated January 19, 1869; reissue No. 4,926, dated May 28, 1872.

*To all whom it may concern:*

Be it known that the following is a full, clear, and exact description of the invention of GUSTAVUS R. WINKLER, of Williamsport, Pennsylvania, in Automatic Swing-Bridges, reference being had to the accompanying drawing making part of this specification and to the letters of reference marked thereon, like letters indicating like parts wherever they occur.

The invention relates to swing-bridges for crossing canals; and consists in providing such bridges with an apparatus for turning, composed of two corresponding sets of rails, each having similar inclines, preferably three in number, one set of rails placed directly over the other, and turning upon interposed loose rollers or trucks, preferably three in number, so arranged that when the bridge is opened by any force its superstructure will be raised, and when the bridge is relieved from that force it will return by its own weight to its first posirion; also, in combining with the two sets of rails and the rollers or trucks, a spider centrally pivoted; also, in the combination of its various operating parts, constructed, arranged, and operating as more fully hereinafter described.

Figure 1:
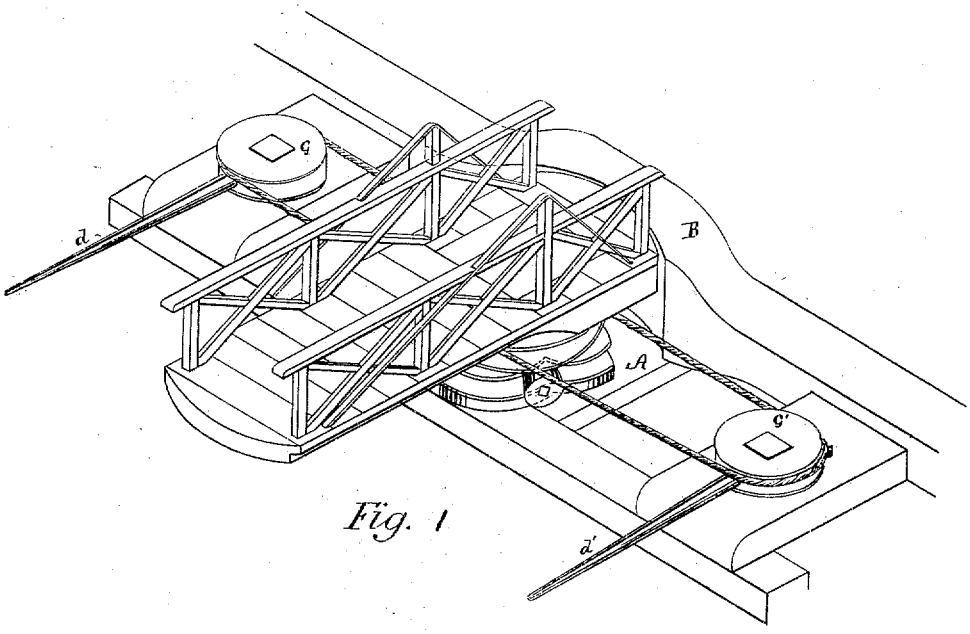
Figure 2:
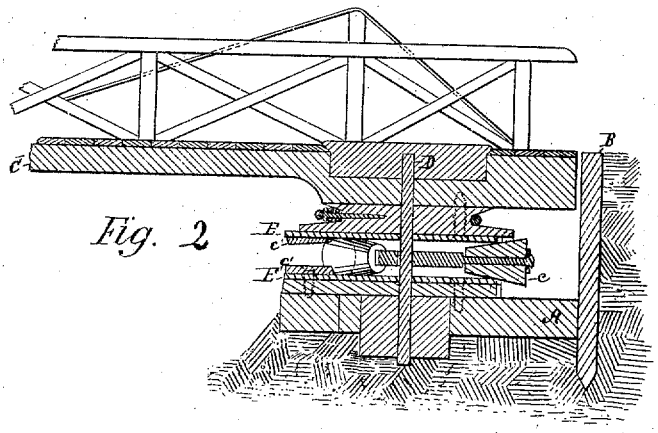
Figure 3:
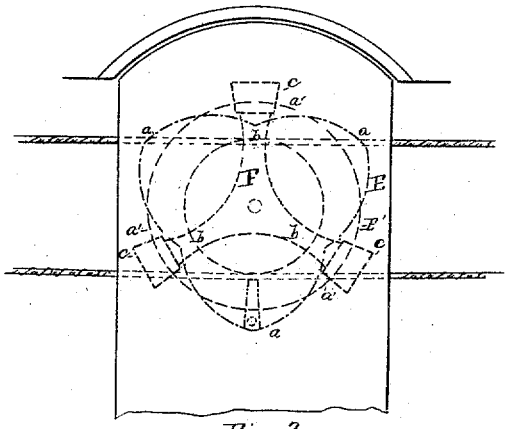
Figure 4:
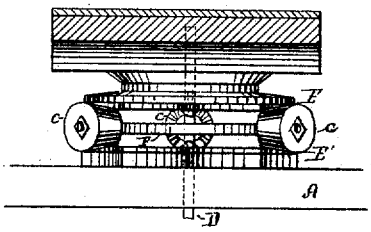

In the drawing, Figure 1 is a perspective view. Fig. 2 is a transverse vertical section on the line *x x* of Fig. 3. Fig. 3 is a top-plan view with the form of the friction-rollers and the rails dotted in; and Fig. 4 is a front elevation, showing the two sets of rails, the spider, and rollers.

In the construction of bridges across canals, wherever they cross traveled roads, unless built high enough to allow boats to pass under them, it is necessary to keep a bridge-tender to open the bridge for the passage of the boats and to close it after the boat has passed.

The object of this invention is to provide a bridge that may be opened by the boat and closed automatically. To secure this object there is constructed a platform, A, and abutment B, as shown in Figs. 1 and 2, upon the side or bank of the canal. Upon the platform A is placed the rear end of the bridge C, so constructed that the end resting upon the platform A shall balance its opposite end, which stretches across the canal. In the part of the bridge C immediately over the platform A is placed a strong iron bolt, D, of sufficient length to connect the bridge with the platform and allow it to turn upon or with the bolt D, as clearly shown in Fig. 2. On the under side of the bridge C and about the bolt D are placed the rails E, with three inclines, shown by the letters *a a a*, and directly below these, on the upper side of the platform A, similar rails E′, with corresponding inclines *a′ a′ a′*, between which two sets of rails the spider F, having three arms, *b*, each provided with a roller or truck, *c*, turns upon said bolt D, which passes through its center. Each of said rails E E′ is provided with one or more angular stops, *c′*, for the purpose of arresting the opening of the bridge at the proper point and giving it a slight impetus on its return. One of the forms for making the inclines *a a a* and *a′ a′ a′*, and the one shown particularly, is with said inclines bending outward on the same plane with the remainder of the rail, in which instance, also, the rollers or tracks *c* are conical, with the larger end outward. On each side of the rear end of bridge C, and in the same horizontal plane, or nearly so, with the wheel F, and equidistant from it, are placed the pulleys or wheels G G′, provided with the levers *d d′*, of sufficient length to reach nearly across the canal. Around the wheels G G′ is placed the lever chain or rope *e*, as shown in Fig. 3, attaching it to them as well as to a pulley on the under side of the bridge C, and in such a way that when they turn the bridge will be turned at the same time.

In operating this bridge when placed in position as thus described, it will be seen that as the boat passes along the canal it will strike against one or the other of the levers *d d′*, depending upon the direction it may be moving, and press the lever forward. As the lever is pressed forward it turns the wheels G G′, which in turn swing the bridge.

The wheels G G′, lever-chain *e*, and levers *d d′* may be dispensed with, except in very long and heavy bridges, where more power may be required to move the bridge than the impact directly against it of a passing canal-boat.

When heavy bridges are used a spring-beam may be placed below the hind edge of the bridge, with its spring end toward the center and the lever-chains or ropes fastened to it. By this arrangement, when the boat strikes the levers the spring-beam will give and the bridge be opened gradually. Without it the momentum of the boat with the inertia of the bridge might cause injury to one or both of them.

In operation the passing canal-boat strikes the levers, when they are used, which, operating upon the wheels G G′, swing the bridge open. When the boat has passed the bridge returns by its own weight to place. When no levers, wheels G G′, or chains are used, the bow of the boat strikes directly against the side of the bridge and swings it around, and when relieved of the pressure it returns to place by its own weight. In either instance the operation of the rollers or trucks, acting upon the inclines of the rails, raises the bridge as it is opened, and by its own weight the bridge compels the rollers to run back over the inclines until it gets to its lowest point. To produce the best action, therefore, the two sets of rails should be nearest together when the bridge is closed and furthest apart when the bridge is open.

The advantage of three rollers and three inclines to each rail is, that three is the smallest number of trucks upon which an object can rest and preserve its equipoise; and three inclines also give a more gentle slope than four or any greater number, whereby friction is greatly diminished. By using the two sets of similar rails, one above the other, the friction is again reduced, and in fact diminished to the last degree.

Having thus described this device, what we claim as new therein, and the invention of GUSTAVUS R. WINKLER, is—

1. In swinging bridges, two similar sets of rails provided with inclines arranged one directly above the other, with interposed loose rollers, substantially as set forth.

2. In swinging bridges, the combination of two similar sets of rails provided with inclines arranged one directly over the other, with three intermediate rollers or trucks, substantially as set forth.

3. In swinging bridges, the combination of two similar sets of rails provided with inclines arranged one directly above the other, and an intermediate pivoted spider provided with rollers or trucks, substantially as set forth.

4. The combination of the levers *d d′* with the swing-bridge C, provided with the two sets of rails E E′ and rollers or trucks *c*, constructed and arranged to operate substantially as described.

BERNHARDT BERNDT.
MARTHA WINKLER.

Witnesses:
GUSTAV. R. WINKLER,
J. L. MEREDITH.